United States Patent
Shiroishi et al.

(10) Patent No.: US 9,013,639 B2
(45) Date of Patent: Apr. 21, 2015

(54) ELECTRONIC APPARATUS HAVING A MODULE PROTECTION BUFFER

(75) Inventors: Toshikazu Shiroishi, Hamura (JP);
Tomohiro Hamada, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 541 days.

(21) Appl. No.: 13/361,532

(22) Filed: Jan. 30, 2012

(65) Prior Publication Data

US 2012/0307164 A1 Dec. 6, 2012

(30) Foreign Application Priority Data

May 30, 2011 (JP) ................. 2011-121045

(51) Int. Cl.
*H04N 5/64* (2006.01)
*G06F 1/16* (2006.01)
*G06F 1/18* (2006.01)

(52) U.S. Cl.
CPC ............. *G06F 1/1601* (2013.01); *H04N 5/64* (2013.01); *G06F 1/1616* (2013.01); *G06F 1/1658* (2013.01); *G06F 1/187* (2013.01)

(58) Field of Classification Search
CPC .................................................... G06F 1/1601
USPC ........................................................ 348/36
See application file for complete search history.

(56) References Cited

U.S. PATENT DOCUMENTS

| | | | |
|---|---|---|---|
| 6,717,816 B1 | 4/2004 | Tanaka et al. | |
| 6,888,718 B2 | 5/2005 | Nakamura | |
| 7,164,577 B2 | 1/2007 | Minaguchi et al. | |
| 7,606,023 B2 | 10/2009 | Konno et al. | |
| 7,675,741 B2 | 3/2010 | Tanaka | |
| 2002/0195913 A1 | 12/2002 | Nakamura | |
| 2005/0039995 A1 | 2/2005 | Inoke et al. | |
| 2006/0262232 A1* | 11/2006 | Kuwajima et al. | 348/836 |
| 2011/0080710 A1 | 4/2011 | Yusuke et al. | |

FOREIGN PATENT DOCUMENTS

| | | |
|---|---|---|
| JP | 10 303570 A2 | 11/1998 |
| JP | 2001-282387 A2 | 10/2001 |
| JP | 2002 358773 A2 | 12/2002 |
| JP | 2004 272644 A2 | 9/2004 |
| JP | 2005-100514 A2 | 4/2005 |
| JP | 2005-157790 A2 | 6/2005 |
| JP | 2006-228300 A2 | 8/2006 |
| JP | 2007-66338 A2 | 3/2007 |
| JP | 2007-128144 A2 | 5/2007 |
| JP | 2007-328613 A2 | 12/2007 |
| JP | 2009-43095 A2 | 2/2009 |
| JP | 2011-081437 A2 | 4/2011 |
| WO | WO 03-103356 A1 | 12/2003 |

OTHER PUBLICATIONS

Notice of Reasons for Rejection for Japanese Patent Application 2011-121045 mailed Apr. 17, 2012.

* cited by examiner

*Primary Examiner* — Dave Czekaj
*Assistant Examiner* — Leron Beck
(74) *Attorney, Agent, or Firm* — Knobbe Martens Olson & Bear LLP

(57) ABSTRACT

According to one embodiment, an electronic apparatus includes a housing, a module including a fixing portion, and a supporting portion configured to support the module. The supporting portion includes a portion configured to receive stress from the housing at an outer region relative to the fixing portion.

13 Claims, 10 Drawing Sheets

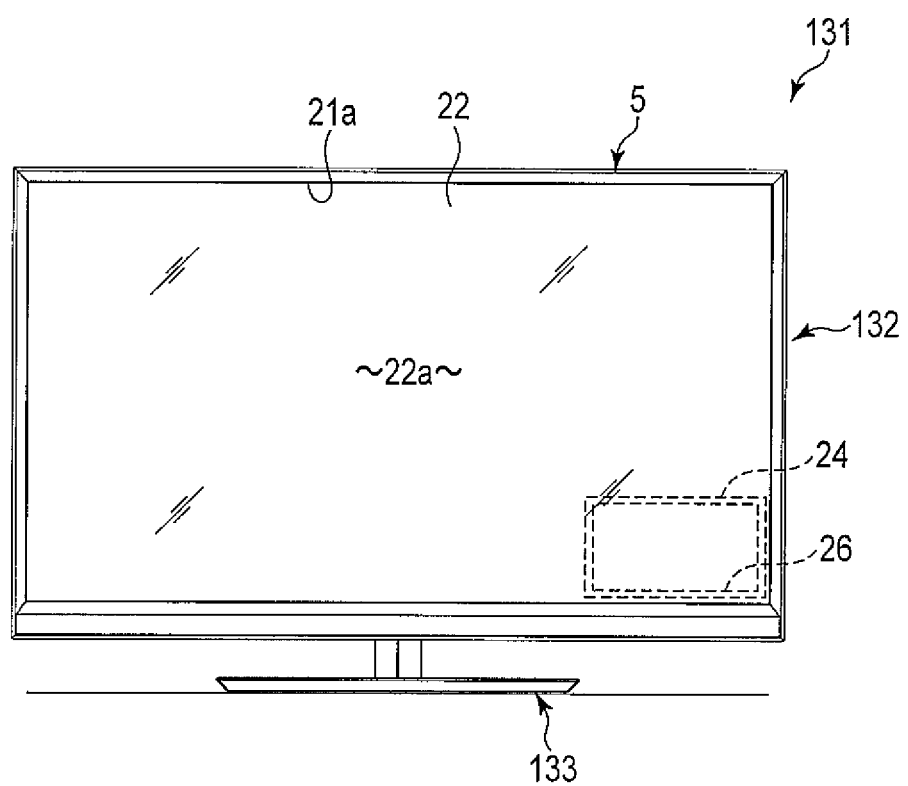
F I G. 1

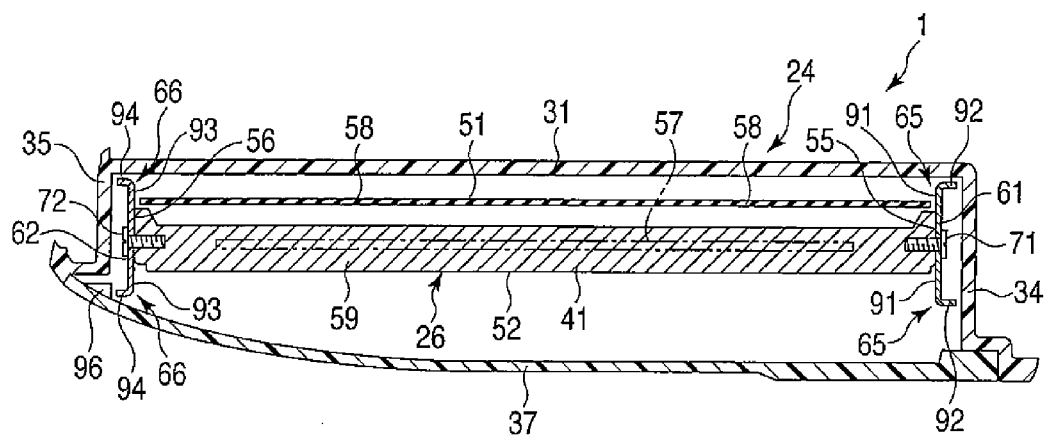
F I G. 12
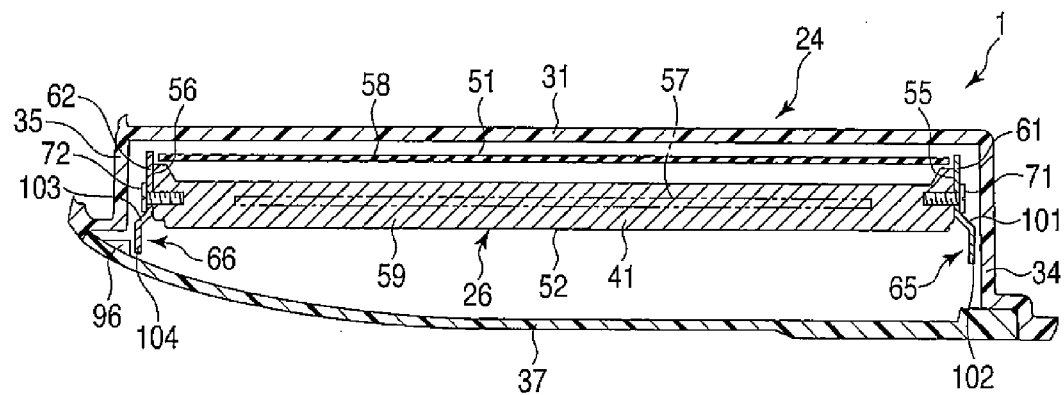
F I G. 13
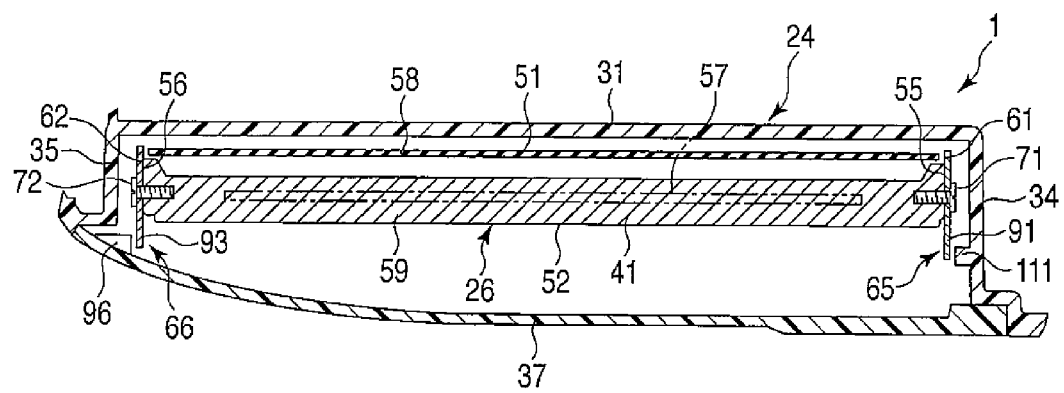
F I G. 14

ELECTRONIC APPARATUS HAVING A MODULE PROTECTION BUFFER

CROSS-REFERENCE TO RELATED APPLICATIONS

This application is based upon and claims the benefit of priority from prior Japanese Patent Application No. 2011-121045, filed May 30, 2011, the entire contents of which are incorporated herein by reference.

FIELD

Embodiments described herein relate generally to a television and an electronic apparatus.

BACKGROUND

An electronic apparatus comprises a module such as, for example, a hard disk drive (hereinafter referred to as an HDD).

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary front view of a television according to a first embodiment;

FIG. 12 is an exemplary cross-sectional view of an HDD accommodation portion according to a third embodiment;

FIG. 13 is an exemplary cross-sectional view of an HDD accommodation portion according to a fourth embodiment;

FIG. 14 is an exemplary cross-sectional view of an HDD accommodation portion according to a fifth embodiment;

DETAILED DESCRIPTION

Figure 2:
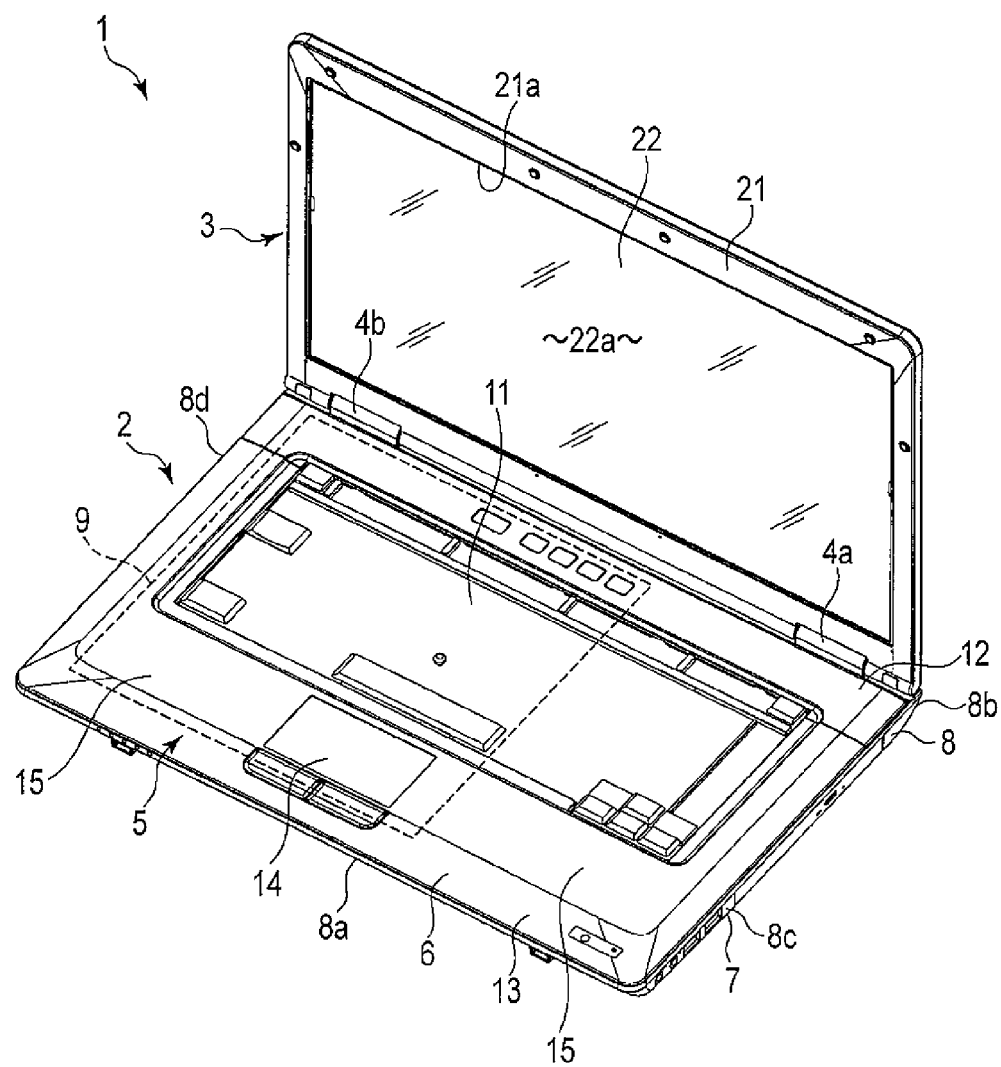
FIG. 2 is an exemplary perspective view of an electronic apparatus according to a second embodiment.

Various embodiments will be described hereinafter with reference to the accompanying drawings.

In general, according to one embodiment, an electronic apparatus comprises a housing, a module comprising a fixing portion, and a supporting portion configured to support the module. The supporting portion comprises a portion configured to receive stress from the housing at an outer region relative to the fixing portion.

Hereinafter, embodiments will be described with reference to the drawings.

First Embodiment

FIG. 1 illustrates a television 131 according to the first embodiment. The television 131 includes a main unit 132 and a stand 133 that supports the main unit 132. The main unit 132 includes a housing 5 and a display device 22 accommodated in the housing 5. The display device 22 includes a display screen 22a on which images are displayed. The housing 5 includes an opening 21a through which the display screen 22a is exposed.

As shown in FIG. 1, the television 131 includes an HDD accommodation portion 24 and an HDD unit 26 according to any one of the second to ninth embodiments described below. According to the television 131 having such a configuration, the same advantageous effects as those described in the second to ninth embodiments described below can be obtained.

The electronic apparatus to which the present embodiment can be applied is not limited to the television 131, but can be applied to a notebook-type portable computer (note PC). Therefore, in the second to ninth embodiments below, an embodiment in which the electronic apparatus is applied to a note PC will be described as a representative example.

Second Embodiment

FIGS. 2 to 11 illustrate an electronic apparatus 1 according to the second embodiment. The electronic apparatus 1 is a note PC, for example. However, the electronic apparatus to which the present embodiment and the other embodiments below can be applied is not limited to the above example, but the embodiments can be broadly applied to various electronic apparatuses, such as, a television, a slate-type portable computer (slate PC), a mobile phone, a smart phone, an electronic book terminal, and a game machine.

As shown in FIG. 2, the electronic apparatus 1 includes a first unit 2, a second unit 3, and hinges 4a and 4b. The first unit 2 is a main unit. The first unit 2 includes a first housing 5 (hereinafter simply referred to as a housing 5). A circuit board 9 serving as a main board, for example, is accommodated in the housing 5. The housing 5 has an upper wall 6, a lower wall 7, and a peripheral wall 8 and has a flat box-like shape. The upper wall 6, the lower wall 7, and the peripheral wall 8 each are examples of a "wall."

The lower wall 7 faces the surface of a table when the electronic apparatus 1 is placed on the table. The lower wall 7 includes a plurality of leg portions 10 that is in contact with the table surface and supports the electronic apparatus 1 (see FIG. 3). The upper wall 6 extends substantially in parallel to the lower wall 7 with a space between the lower wall 7 and the upper wall 6. A first input portion 11 is provided on the upper wall 6. A keyboard is an example of the first input portion 11. In addition, the "input portion" may be a touch panel-type input device and may be other input devices.

The peripheral wall 8 stands on the lower wall 7 and connects the peripheral edge portion of the lower wall 7 and the peripheral edge portion of the upper wall 6. In addition, the peripheral wall 8 and the lower wall 7 may be continuous in a curved surface shape, for example, with no distinct boundary between them. At least a part of the peripheral wall 8 extends in the thickness direction of the housing 5. In the present embodiment, the direction extending from the upper wall 6 toward the lower wall 7 is the "thickness direction of the housing 5."

The housing 5 has a rear end portion 12 (first end portion) and a front end portion 13 (second end portion). The second unit 3 is attached to the rear end portion 12 by the hinges 4a and 4b. The front end portion 13 is disposed on a side opposite to the rear end portion 12.

The peripheral wall 8 includes a front wall 8a, a rear wall 8b, a first side wall 8c (right side wall), and a second side wall 8d (left side wall). The front wall 8a is disposed on the front end portion 13 of the housing 5 so as to extend in a horizontal width direction (left and right direction) of the housing 5. The rear wall 8b is disposed on the rear end portion 12 of the housing 5 so as to extend in the horizontal width direction of the first housing 5 substantially in parallel to the front wall 8a. The side walls 8c and 8d extend in a depth width direction (front and rear direction) of the housing 5. The side walls 8c and 8d connect the end portions of the front wall 8a and the end portions of the rear wall 8b.

As shown in FIG. 2, the upper wall 6 includes a second input portion 14 and a palm rest 15 which are disposed between the first input portion 11 and the front wall 8a. A pointing device (for example, a touch pad) is an example of the second input portion 14. The second input portion 14 is not limited to this. The palm rest 15 is disposed between the second input portion 14 and the first side wall 8c and between the second input portion 14 and the second side wall 8d.

As shown in FIG. 2, the second unit 3 is a display unit, for example, and includes a second housing 21 and a display device 22 accommodated in the second housing 21. The display device 22 is a liquid crystal display, for example, but is not limited to this. The display device 22 has a display screen 22a on which images are displayed. The second housing 21 includes an opening 21a through which the display screen 22a is exposed to the outside.

The second housing 21 is pivotably (openably) attached to the rear end portion 12 of the first housing 5 by the hinges 4a and 4b. In this way, the electronic apparatus can pivot between a first position where the first and second units 2 and 3 overlap each other and a second position where the first and second units 2 and 3 are open in relation to each other.

Next, the HDD accommodation portion 24 will be described.

Figure 3:
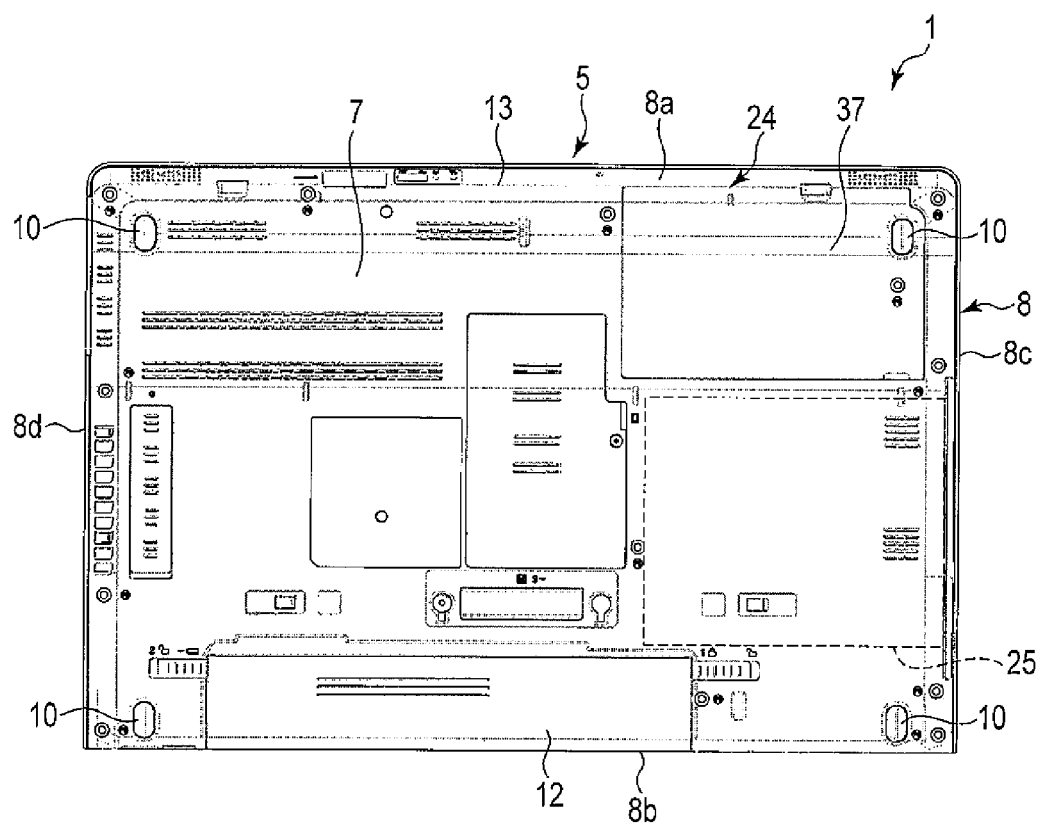
FIG. 3 is an exemplary bottom view of the electronic apparatus shown in FIG. 2.

As shown in FIG. 3, the HDD accommodation portion 24 is provided at a corner of the housing 5 defined by the front wall 8a and the first side wall 8c. The HDD accommodation portion 24 is disposed under the palm rest 15. The longitudinal direction of the HDD accommodation portion 24 is substantially identical to the extension direction of the palm rest 15. On the other hand, an optical disk drive (ODD) unit 25 is mounted between the HDD accommodation portion 24 and the rear wall 8b. The ODD unit 25 is disposed under the first input portion 11.

Figure 4:
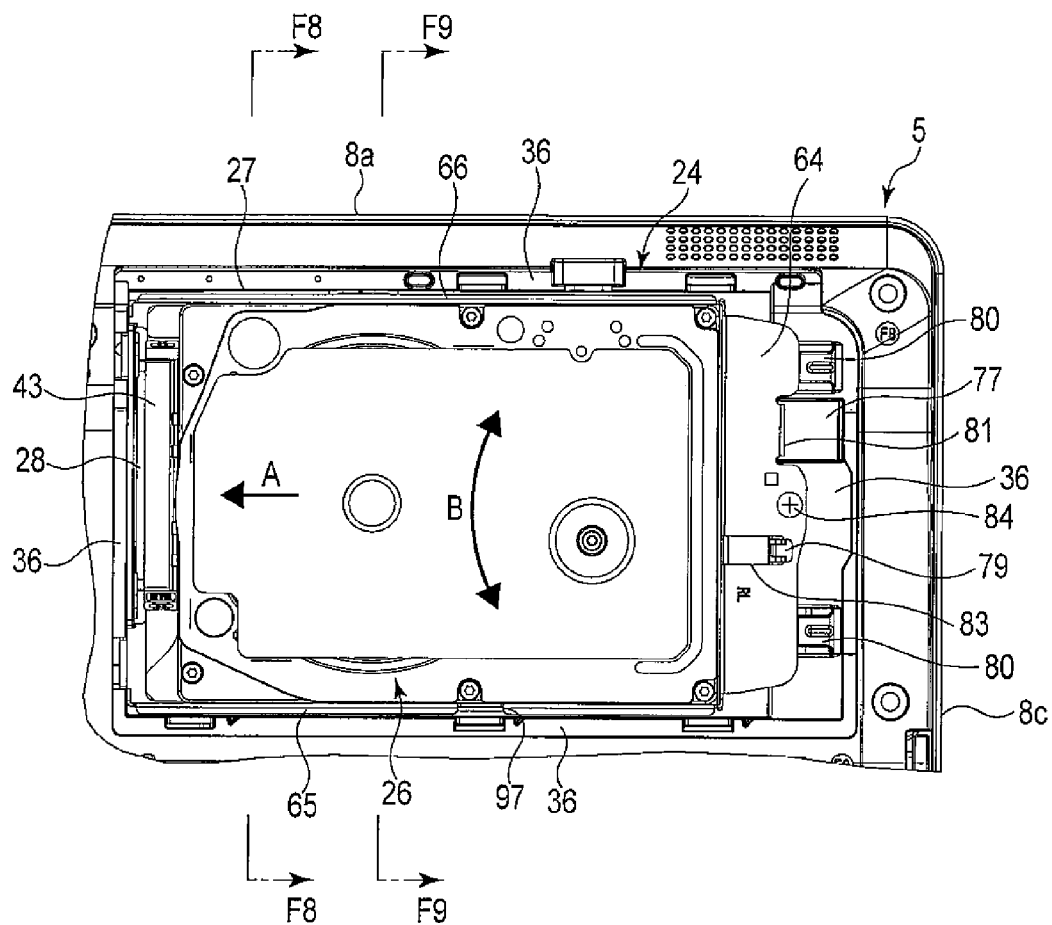
FIG. 4 is an exemplary bottom view of an HDD accommodation portion shown in FIG. 3.

As shown in FIGS. 3 and 4, the HDD accommodation portion 24 is provided on the lower wall 7 of the housing 5. The HDD accommodation portion 24 is a depression which is recessed from the lower wall 7 toward the inner side of the housing 5. The HDD accommodation portion 24 accommodates the HDD unit 26. The HDD accommodation portion 24 is an example of an "accommodation portion." The HDD unit 26 is an example of a "unit." The "accommodation portion" and the "unit" are not limited to these examples. For example, the unit may be accommodated in an accommodation portion which is provided in the depressed surface of the housing 5, and alternatively, may be accommodated inside the housing.

Figure 8:
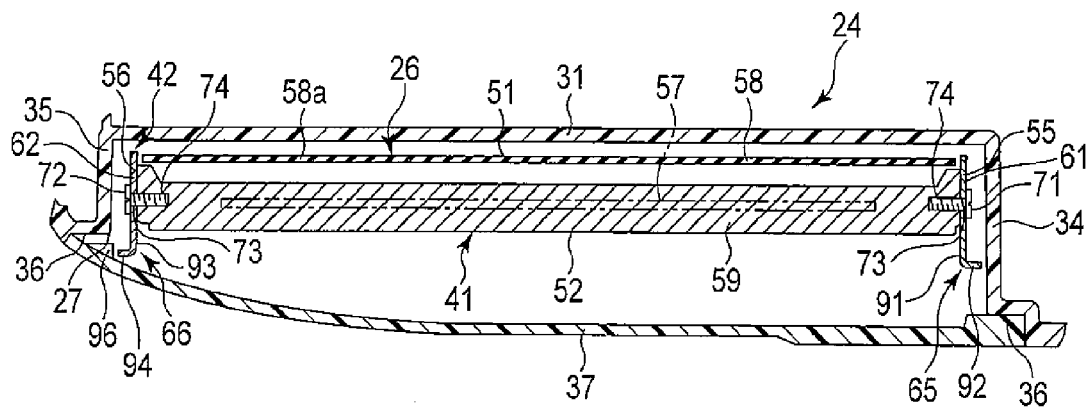
FIG. 8 is an exemplary cross-sectional view taken along the line F8-F8, of the HDD accommodation portion shown in FIG. 4.

As shown in FIGS. 4 and 8, the HDD accommodation portion 24 has a substantially rectangular shape that is much larger than the HDD unit 26, for example. The HDD accommodation portion 24 includes an opening 27 that is open toward the outside, and the inside of the HDD accommodation portion 24 can be exposed to the outside through the opening 27.

Figure 5:
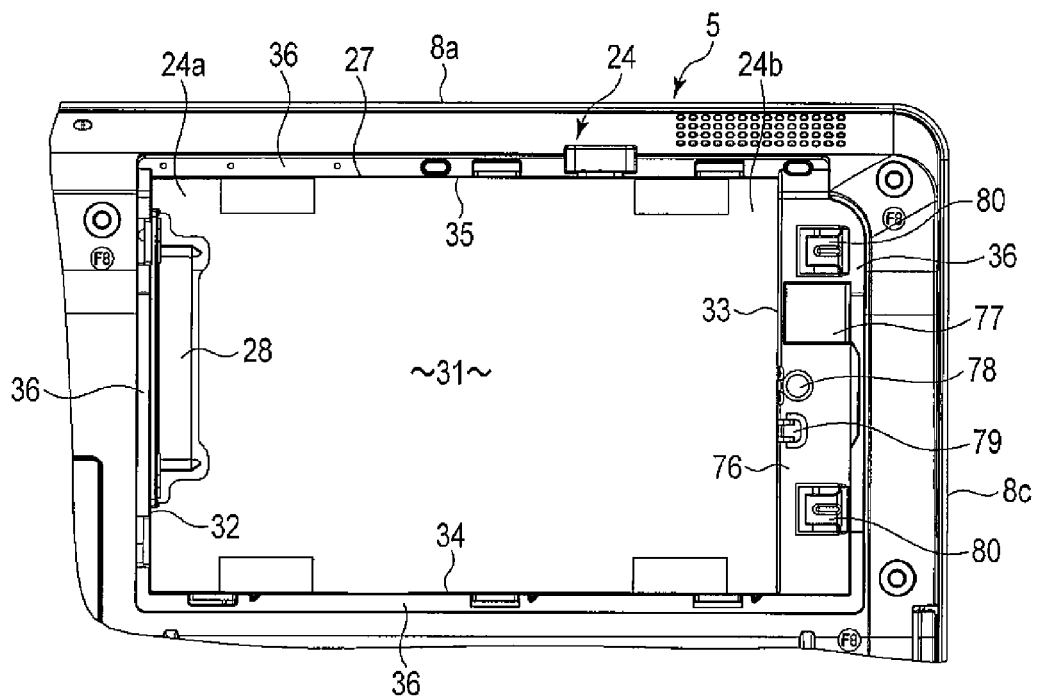
FIG. 5 is an exemplary bottom view of a state where the HDD of the HDD accommodation portion shown in FIG. 4 is removed.

As shown in FIG. 5, the HDD accommodation portion 24 includes a first end portion 24a in which a first connector 28 is provided and a second end portion 24b which is disposed on a side opposite to the first end portion 24a. Moreover, the HDD accommodation portion 24 includes a first wall 31 and second to fifth walls 32, 33, 34, and 35 which are standing walls standing on the periphery of the first wall 31. The first to fifth walls 31, 32, 33, 34, and 35 are examples of a "wall."

The first wall 31 extends substantially in parallel to the upper wall 6 of the housing 5 (substantially in parallel to the longitudinal direction of the HDD unit 26) and forms the ceiling (or the bottom) of the HDD accommodation portion 24. The second to fifth walls 32, 33, 34, and 35 extend in the thickness direction of the housing 5 from different end portions of the first wall 31 toward the lower wall 7. The second to fifth walls 32, 33, 34, and 35 cooperate with each other to surround the HDD unit 26 from four directions and define the opening 27.

The second wall 32 is provided on the first end portion 24a and includes an opening (not shown) through which the first connector 28 is exposed. Through the opening, the first connector 28 mounted on the circuit board 9 is exposed to the HDD accommodation portion 24.

The third wall 33 is provided on the second end portion 24b of the HDD accommodation portion 24. The fourth and fifth walls 34 and 35 extend in directions (for example, substantially perpendicular directions) crossing the second and third walls 32 and 33 and connect the second and third walls 32 and 33. As shown in FIG. 8, the thickness of the housing 5 decreases as it advances from the rear end portion 12 of the housing 5 toward the front end portion 13. The fifth wall 35 is lower than the fourth wall 34.

As shown in FIGS. 5 and 8, the housing 5 includes a mounting portion 36 which is around the second to fifth walls 32, 33, 34, and 35 and is further depressed from the lower wall 7. An HDD cover 37 that covers the HDD accommodation portion 24 is mounted on the mounting portion 36. The HDD cover 37 is an example of a "cover."

Figure 6:
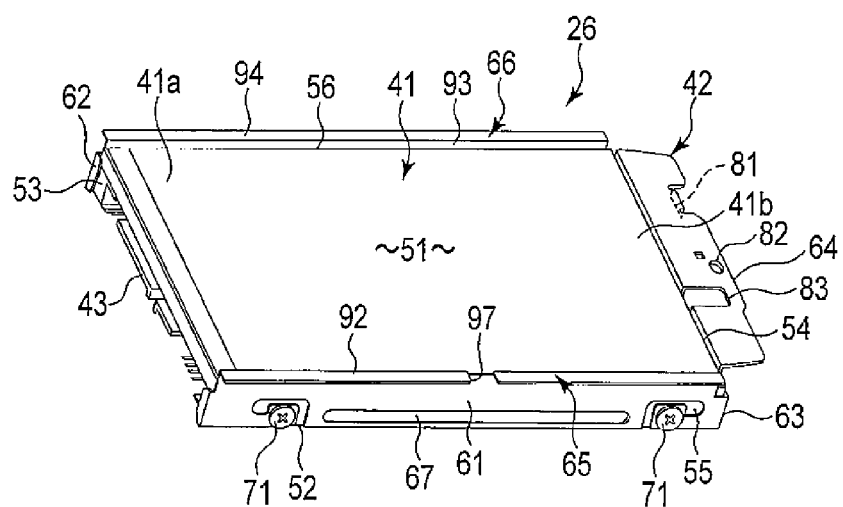
FIG. 6 is an exemplary perspective view of the HDD shown in FIG. 4.
Figure 7:
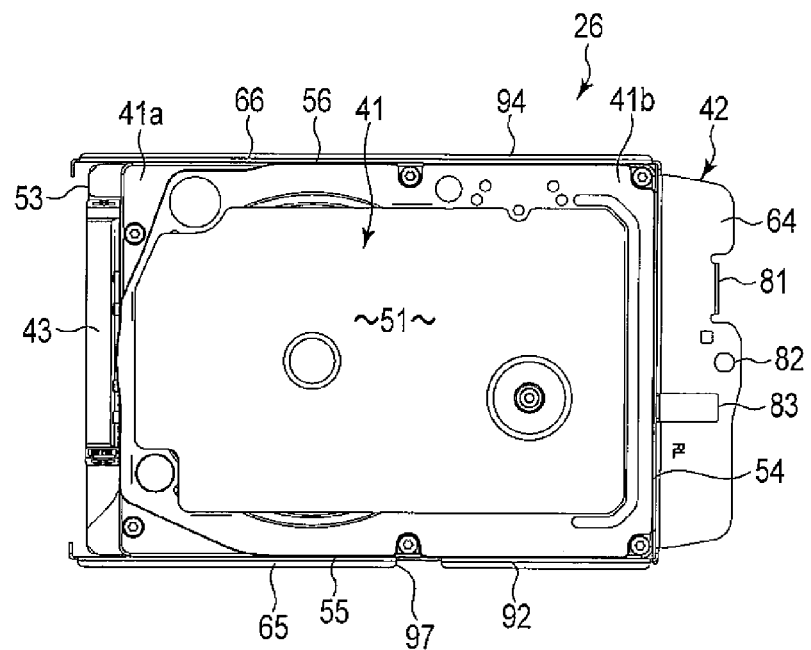
FIG. 7 is an exemplary bottom view of the HDD shown in FIG. 4.

As shown in FIGS. 6 and 7, the HDD unit 26 includes a HDD 41 and a holder 42 that holds the HDD 41. The HDD 41 is an example of a "module." The "module" may be a solid state drive (SSD) and other storage devices, or other modules. The holder 42 is an example of a "supporting portion."

The HDD 41 includes a first end portion 41a and a second end portion 41b that is disposed on a side opposite to the first end portion 41a. A second connector 43 which is connected to the first connector 28 of the HDD accommodation portion 24 is provided in the first end portion 41a. The second connector 43 is directly connected (that is, fitted) to the first connector 28 without through a flexible cable, for example.

The HDD unit 26 is attached to the HDD accommodation portion 24 as follows. First, the HDD unit 26 is inserted into the HDD accommodation portion 24 from a substantially vertical direction. Moreover, the HDD unit 26 is slid in the direction indicated by the arrow A in FIG. 4. In this way, the second connector 43 is mechanically connected to the first connector 28, and the HDD unit 26 is electrically connected to the circuit board 9.

As shown in FIGS. 6 and 7, the HDD 41 has a rectangular and flat shape and includes first and second surfaces 51 and 52 which are relatively large and third to sixth surfaces 53, 54, 55, and 56 which are relatively smaller than the above surfaces. The first and second surfaces 51 and 52 are so-called principal surfaces and extend substantially in parallel to a magnetic disk 57 (see FIG. 8) disposed inside the HDD 41. The third to sixth surfaces 53, 54, 55, and 56 are so-called peripheral surfaces (side surfaces). The third to sixth surfaces 53, 54, 55, and 56 extend in directions (for example, substantially perpendicular directions) crossing the first and second surfaces 51 and 52 and connect the peripheral edge portion of the first surface 51 and the peripheral edge portion of the second surface 52.

The third surface 53 is located on the first end portion 41a. The fourth surface 54 is located on the second end portion 41b. The fifth and sixth surfaces 55 and 56 extend in directions (for example, substantially perpendicular directions) crossing the third and fourth surfaces 53 and 54 and connect the third and fourth surfaces 53 and 54.

As shown in FIG. 8, the HDD 41 includes a board portion 58 and a disk portion 59. The board portion 58 is an example of a "first portion" of the HDD 41. The disk portion 59 is an example of a "second portion" of the HDD 41. The board portion 58 and the disk portion 59 have substantially the same size as the outer shape of the HDD 41 in plan views thereof, for example. The board portion 58 and the disk portion 59 overlap each other in the thickness direction of the HDD 41. The "thickness direction of the HDD 41" is the direction from the first surface 51 to the second surface 52.

The board portion 58 includes a circuit board 58a. The board portion 58 is exposed to the first surface 51. The disk portion 59 accommodates the magnetic disk 57. The magnetic disk 57 is an example of a "disk." The disk portion 59 is weaker in mechanical strength than the board portion 58 and weak to impact. The disk portion 59 is exposed to the second surface 52.

As shown in FIGS. 6 and 7, the holder 42 supports the HDD 41. The holder 42 includes first to fourth portions 61, 62, 63, and 64. The first to fourth portions 61, 62, 63, and 64 and first and second buffers 65 and 66 described later are integrally formed of a metallic member (for example, a metal plate), for example.

As shown in FIGS. 6 to 8, the first portion 61 has a plate-like shape extending along the fifth surface 55 of the HDD 41 and extends over the entire length of the HDD 41. Moreover, the first portion 61 extends over the entire thickness of the HDD 41.

Figure 9:
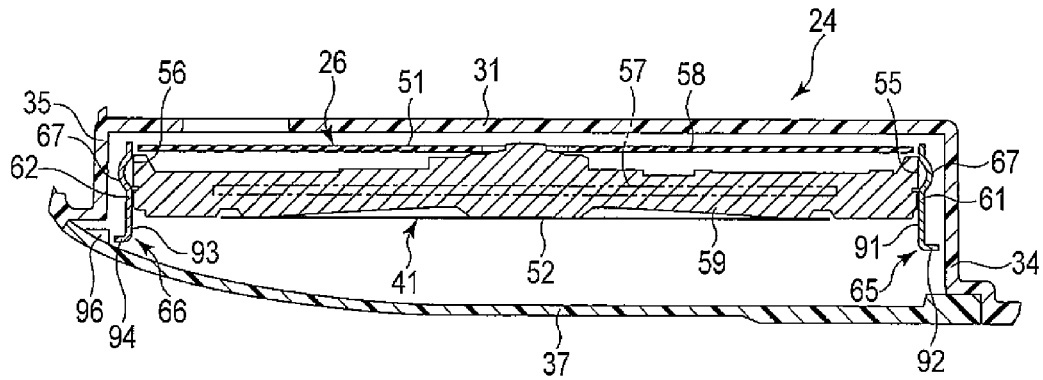
FIG. 9 is an exemplary cross-sectional view taken along the line F9-F9, of the HDD accommodation portion shown in FIG. 4.

The second portion 62 has a plate-like shape extending along the sixth surface 56 of the HDD 41 and extends over the entire length of the HDD 41. Moreover, the second portion 62 extends over the entire thickness of the sixth surface 56. As shown in FIGS. 6 and 9, the first and second portions 61 and 62 each include a projection 67 which protrudes toward the outer side of the HDD unit 26. Although the projection 67 is provided for the purpose of improving the strength of the holder 42, for example, it may be used for other purposes.

As shown in FIGS. 6 and 8, the HDD unit 26 includes first and second screws 71 and 72 that fix the HDD 41 and the holder 42 together. The screws 71 and 72 are examples of a "fixing portion." The "fixing portion" is not limited to these examples, but may be a welding pin and other fixing portions. The first and second portions 61 and 62 of the holder 42 each include an insertion hole 73. The HDD 41 includes screw holes 74 facing the insertion holes 73. The screws 71 and 72 engage with the screw holes 74 through the insertion holes 73. In this way, the HDD 41 and the holder 42 are fixed together.

As shown in FIG. 8, portions (for example, screw heads) of the first and second screws 71 and 72 protrude from the HDD 41 in directions (for example, substantially perpendicular directions) crossing the thickness direction of the HDD 41. The first screw 71 is attached to the first portion 61 of the holder 42 so as to protrude toward the fourth wall 34 of the HDD accommodation portion 24. The second screw 72 is attached to the second portion 62 of the holder 42 so as to protrude toward the fifth wall 35 of the HDD accommodation portion 24. That is, the second screw 72 protrudes in a direction opposite to the first screw 71.

As shown in FIGS. 6 and 7, the third portion 63 has a plate-like shape extending along the fourth surface 54 of the HDD 41 and connects the end portion of the first portion 61 and the end portion of the second portion 62. The fourth portion 64 extends from the third portion 63 to a side away from the HDD 41.

As shown in FIG. 5, the HDD accommodation portion 24 includes an attachment portion 76 that receives the fourth portion 64 of the holder 42. The attachment portion 76 is adjacent to the third wall 33 and faces the fourth portion 64 of the holder 42. The attachment portion 76 includes a recess 77, a screw hole 78, a hook 79, and a terminal 80. The terminal 80 is electrically connected to the ground provided on the housing 5. The terminal 80 touches the holder 42 of the HDD unit 26. In this way, the holder 42 of the HDD unit 26 is electrically connected to the ground of the housing 5.

As shown in FIG. 6, the fourth portion 64 of the holder 42 includes a hook 81, an insertion hole 82, and an engagement hole 83. The hook 81 engages with the recess 77 of the attachment portion 76. The insertion hole 82 faces the screw hole 78 of the attachment portion 76. The third screw 84 (see FIG. 4) engages with the screw hole 78 through the insertion hole 82. The third screw 84 is an example of a fixing portion that fixes the holder 42 and the housing 5 together. In this way, the engagement hole 83 engages with the hook 79 of the attachment portion 76. The recess 77, the screw hole 78, the hooks 79 and 81, the insertion hole 82, and the engagement hole 83 are examples of an "engagement portion." The engagement portion is not limited to these examples.

Next, the first and second buffers 65 and 66 provided in the holder 42 will be described.

As shown in FIG. 8, the first and second buffers 65 and 66 are formed by designing a part of a metal plate that forms the holder 42 so as to protrude further outward with respect to the HDD 41 than an end surface (for example, the second surface 52) of the HDD 41. More specifically, the first buffer 65 is provided on the first portion 61 of the holder 42. The first buffer 65 includes a first portion 91 and a second portion 92.

The first portion 91 extends in the thickness direction of the HDD 41 and protrudes further outward than the HDD 41 (i.e., protrudes outside the HDD41). That is, the first portion 91 protrudes from the second surface 52 of the HDD 41 to the outside of the HDD 41. The first portion 91 protrudes further outward than the second surface 52 of the HDD 41 by a length larger than the plate thickness of the first portion 91, for example.

The first portion 91 extends in the thickness direction of the HDD 41 and has a plate-like shape of which the surface faces in the protruding direction of the first screw 71. That is, the first portion 91 is a damper which can be bent when a certain degree of force (i.e., stress) is applied from the protruding direction of the first screw 71. The first portion 91 does not overlap the HDD 41 in the protruding direction of the first screw 71. That is, the first portion 91 is located at a position away from the side surface of the HDD 41. A space in which the first portion 91 is allowed to collapse (i.e., bend) is present on the back side of the first portion 91.

The second portion 92 is a bent portion that is bent from the end portion of the first portion 91, for example. The second portion 92 extends in a direction (for example, a substantially perpendicular direction) crossing the thickness direction of the HDD 41. The second portion 92 has a plate-like shape substantially parallel to the second surface 52 of the HDD 41, for example.

As shown in FIG. 8, the second portion 92 protrudes further outward with respect to the HDD 41 than the first screw 71 in the protruding direction of the first screw 71. That is, the second portion 92 protrudes from the first portion 91 toward the fourth wall 34 of the HDD accommodation portion 24 and is located closer to the fourth wall 34 than the first screw 71. In this way, the second portion 92 can come into contact with the housing 5 earlier than the first screw 71.

The first buffer 65 is an example of a portion that receives stress from the housing 5 at an outer region relative to (i.e., at an outside of) the first screw 71 (i.e., fixing portion). Moreover, the first buffer 65 is an example of a portion that protrudes further outward than the HDD 41 in the thickness direction of the HDD 41 and receives pressing force applied in a direction crossing the thickness direction of the HDD 41.

As shown in FIG. 9, the second portion 92 protrudes further outward than the projection 67 in the protruding direction of the projection 67 of the holder 42. In this way, the second portion 92 can come into contact with the housing 5 earlier than the projection 67.

On the other hand, as shown in FIG. 8, the second buffer 66 is provided on the second portion 62 of the holder 42. Similarly to the first buffer 65, the second buffer 66 includes a first portion 93 and a second portion 94. The first portion 93 extends in the thickness direction of the HDD 41 and protrudes further outward than the HDD 41 (i.e., protrudes outside the HDD 41). That is, the first portion 93 protrudes from the second surface 52 of the HDD 41 to the outside of the HDD 41. The first portion 93 protrudes further outward than the second surface 52 of the HDD 41 by a length larger than the plate thickness of the first portion 93, for example.

The first portion 93 extends in the thickness direction of the HDD 41 and has a plate-like shape of which the surface faces in the protruding direction of the second screw 72. That is, the second portion 94 is a damper which can be bent when a certain degree of force (i.e., stress) is applied from the protruding direction of the second screw 72. The second portion 94 does not overlap the HDD 41 in the protruding direction of the second screw 72. That is, the first portion 93 is located at a position away from the side surface of the HDD 41. A space in which the first portion 93 is allowed to collapse (i.e., bend) is present on the back side of the first portion 93.

The second portion 94 is a bent portion that is bent from the end portion of the first portion 93, for example. The second portion 94 extends in a direction (for example, a substantially perpendicular direction) crossing the thickness direction of the HDD 41. The second portion 94 has a plate-like shape substantially parallel to the second surface 52 of the HDD 41, for example.

As shown in FIG. 8, the second portion 94 protrudes further outward with respect to the HDD 41 than the second screw 72 in the protruding direction of the second screw 72. The HDD cover 37 includes a rib 96 that faces the second buffer 66. The rib 96 is an example of a "receiver." The second portion 94 of the second buffer 66 protrudes from the first portion 93 toward the rib 96 of the HDD cover 37 and is located closer to the rib 96 than the second screw 72. In this way, the second portion 94 can come into contact with the HDD cover 37 earlier than the second screw 72 coming into contact with the housing 5.

The second buffer 66 is an example of a portion that receives stress from the HDD cover 37 at an outer region relative to (i.e., at an outside of) the second screw (i.e., fixing portion). Moreover, the second buffer 66 is an example of a portion that protrudes further outward than the HDD 41 in the thickness direction of the HDD 41 and receives pressing force applied in a direction crossing the thickness direction of the HDD 41.

As shown in FIG. 9, the second portion 94 protrudes further outward than the projection 67 in the protruding direction of the projection 67 of the holder 42. In this way, the second portion 94 can come into contact with the HDD cover 37 earlier than the projection 67 coming into contact with the housing 5.

As shown in FIG. 8, the first and second buffers 65 and 66 are provided in a portion of the HDD accommodation portion 24 close to the opening 27. That is, the first and second buffers 65 and 66 protrude from the inside of the HDD accommodation portion 24 toward the opening 27.

As shown in FIG. 8, the board portion 58 of the HDD 41 is disposed close to the first wall 31 of the HDD accommodation portion 24, and the disk portion 59 is disposed close to the opening 27. The first and second buffers 65 and 66 protrude from the side of the disk portion 59. In the present embodiment, no buffer is provided on the side of the board portion 58.

As shown in FIGS. 6 and 7, the first buffer 65 is provided over substantially the entire length in the longitudinal direction of the HDD 41. The first buffer 65 includes a cut-out portion 97 which is disposed at a position corresponding to a claw portion provided in the HDD cover 37. Strictly speaking, the first buffer 65 is not provided at both end portions in the longitudinal direction of the first portion 61 of the holder 42. Similarly, the second buffer 66 is provided over substantially the entire length in the longitudinal direction of the HDD 41. Strictly speaking, the second buffer 66 is not provided at both end portions in the longitudinal direction of the second portion 62 of the holder 42.

Next, the operation of the first and second buffers 65 and 66 will be described.

For example, when the electronic apparatus 1 is dropped by mistake, impact is applied to the electronic apparatus 1. As shown in FIG. 4, the HDD unit 26 and the housing 5 are fixed together by the third screw 84. Thus, when impact is applied to the electronic apparatus 1, the HDD unit 26 is likely to oscillate laterally as indicated by the arrow B in FIG. 4. Moreover, this impact is likely to cause rotary movement as indicated by the arrow C in FIG. 10.

Figure 10:
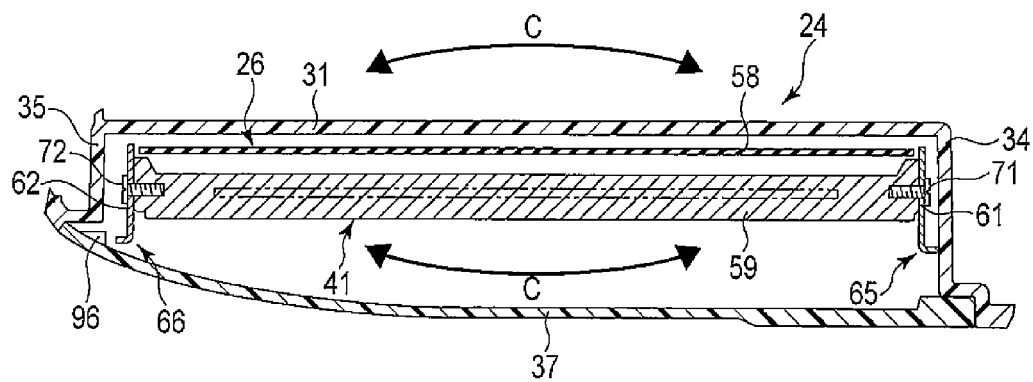
FIG. 10 is an exemplary cross-sectional view of a state where the HDD of the HDD accommodation portion shown in FIG. 8 is displaced.
Figure 11:
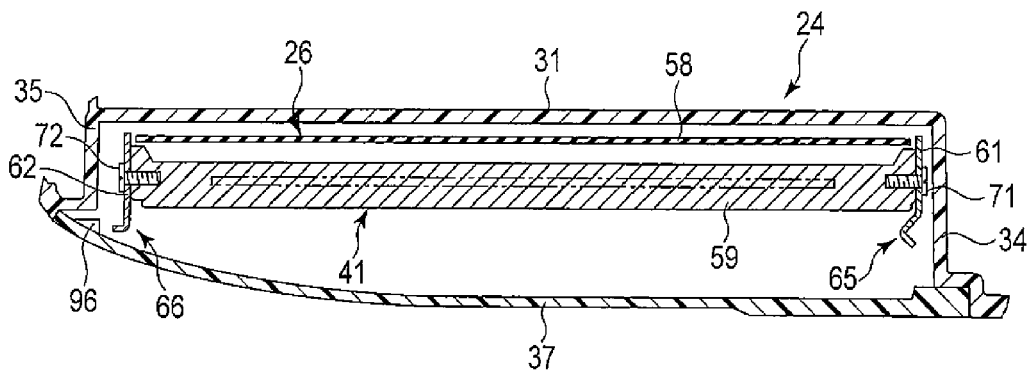
FIG. 11 is an exemplary cross-sectional view of a state where a holder of the HDD accommodation portion shown in FIG. 8 is deformed.

FIG. 10 illustrates an example where the HDD unit 26 is displaced laterally in the right direction in the drawing in response to impact applied thereto. In this case, the second portion 92 of the first buffer 65 comes into contact with the fourth wall 34 of the HDD accommodation portion 24 earlier than the first screw 71 and the projection 67. When the impact is large to some extent, the first buffer 65 in contact with the fourth wall 34 is bent to a side opposite to the fourth wall 34.

In this way, a part of the impact is absorbed, and the impact transmitted to the HDD 41 is alleviated.

On the other hand, when the HDD unit 26 is displaced in the left direction in the drawing, the second portion 94 of the second buffer 66 comes into contact with the rib 96 of the HDD cover 37 earlier than the second screw 72 and the projection 67 coming into contact with the fifth wall 35 of the HDD accommodation portion 24. When the impact is larger to some extent, the second buffer 66 in contact with the HDD cover 37 is bent to a side opposite to the rib 96 of the HDD cover 37. In this way, a part of the impact is absorbed, and the impact transmitted to the HDD 41 is alleviated. The second portion 94 of the second buffer 66 may come into contact with at least one of the rib 96 and the fifth wall 35 earlier than the second screw 72 and the projection 67 coming into contact with the fifth wall 35.

Moreover, when the second buffer 66 comes into contact with the HDD cover 37, the HDD cover 37 may be separated from the housing 5 due to the impact. In this case, when the HDD cover 37 is separated from the housing 5, a part of the impact is absorbed (i.e., distributed). In this way, the impact transmitted to the HDD 41 is further alleviated.

According to such a configuration, it is possible to improve the impact resistance of the electronic apparatus 1.

The first and second screws 71 and 72 that fix the HDD 41 and the holder 42 together engage with the screw holes 73 of the HDD 41 and extend up to the inside of the HDD 41. Thus, when the first and second screws 71 and 72 come into contact with the housing 5, the impact (i.e., stress) from the housing 5 is directly transmitted to the inside of the HDD 41.

Therefore, the holder 42 of the present embodiment includes the first buffer 65 that receives stress from the housing 5 on the outer side than the first screw 71. Thus, the first buffer 65 can absorb a part of the impact before the first screw 71 comes into contact with the housing 5, and impact is transmitted from the first screw 71 to the HDD 41. Accordingly, it is possible to alleviate the impact applied to the HDD 41 and to improve the impact resistance of the electronic apparatus 1.

In other words, since the impact resistance can be increased by a part of the holder 42, it is possible to decrease or omit a buffer member (for example, rubber) which is provided in the HDD accommodation portion 24. This contributes to cost reduction of the electronic apparatus 1.

In the present embodiment, the first buffer 65 includes the first portion 91 which protrudes further outward than the HDD 41 in the thickness direction of the HDD 41, and the second portion 92 which protrudes from the first portion 91 further outward than the first screw 71 in the protruding direction of the first screw 71 and which is configured to come into contact with the housing 5 earlier than the first screw 71. That is, the first buffer 65 is disposed at a position away from the side surface of the HDD 41 and configured to be bent greatly. With this configuration, the first buffer 65 can easily absorb impact.

In the present embodiment, the first portion 91 extends in the thickness direction of the HDD 41 and has a plate-like shape of which the surface faces in the protruding direction of the first screw 71. With this configuration, the first portion 91 is further easily bent when the second portion 92 comes into contact with the housing 5. Thus, the first buffer 65 can further easily absorb impact. In the present embodiment, the holder 42 and the first buffer 65 is integrally formed of a metallic member. According to such a configuration, the first buffer 65 can be realized at a relatively low cost.

In the present embodiment, the HDD 41 includes the board portion 58 and the disk portion 59 which overlaps the board portion 58 in the thickness direction of the HDD 41 and is weaker than the board portion 58. Moreover, the first portion 91 protrudes from the side of the disk portion 59. According to such a configuration, the disk portion 59 which is weak can be protected more effectively.

In the present embodiment, the electronic apparatus further includes the second screw 72 that protrudes in a direction opposite to the first screw 71 and the second buffer 66 that includes the first portion 93 that protrudes further outward than the HDD 41 in the thickness direction of the HDD 41 and the second portion 94 which protrudes from the first portion 93 further outward than the second screw 72 in the protruding direction of the second screw 72. According to such a configuration, the second buffer 66 can absorb a part of impact before the second screw 72 comes into contact with the housing 5, and the impact is transmitted from the second screw 72 to the HDD 41. Accordingly, it is possible to alleviate the impact applied to the HDD 41 and to further improve the impact resistance of the electronic apparatus 1.

In the present embodiment, the electronic apparatus 1 includes the HDD cover 37 that covers the HDD accommodation portion 24. Moreover, the second portion 94 of the second buffer 66 is configured to come into contact with the HDD cover 37 earlier than the second screw 72 coming into contact with the housing 5. When the second buffer 66 comes into contact with the HDD cover 37, the HDD cover 37 may be separated from the housing 5 due to the impact. In this case, when the HDD cover 37 is separated from the housing 5, a part of the impact is distributed. In this way, the second buffer 66 can further alleviate a part of the impact before the impact is transmitted from the second screw 72 to the HDD 41.

In the present embodiment, although the first and second buffers 65 and 66 are provided over the entire length of the HDD 41, they may be provided to be discontinuously over the entire length of the HDD 41 instead of this. For example, cuts may be provided in the first and second buffers 65 and 66 in order to make them more flexible (i.e., bent more easily).

Next, the third to ninth embodiments will be described. Constituent elements having the same or similar functions as the constituent elements of the first and second embodiments will be denoted by the same reference numerals, and description thereof is not provided. The constituent elements other than those described below are the same as those of the second embodiment.

Third Embodiment

FIG. 12 illustrates the electronic apparatus 1 according to the third embodiment. In the present embodiment, the first and second buffers 65 and 66 are provided on the side of the board portion 58 as well as the side of the disk portion 59.

According to such a configuration, it is possible to improve the impact resistance of the electronic apparatus 1 similarly to the second embodiment. When the first and second buffers 65 and 66 are provided on both sides in the thickness direction of the HDD 41, the impact resistance of the electronic apparatus 1 can be further improved.

Fourth Embodiment

FIG. 13 illustrates the electronic apparatus 1 according to the fourth embodiment. The first buffer 65 of the present embodiment includes a first portion 101 which is bent from the midway of the fifth surface 55 of the HDD 41 toward the fourth wall 34 of the HDD accommodation portion 24, and a second portion 102 which extends from the end portion of the first portion 101 substantially in parallel to the fourth wall 34 of the HDD 41. The first portion 101 protrudes further outward than the first screw 71 in the protruding direction of the first screw 71. The second portion 102 is configured to come into contact with the housing 5 earlier than the first screw 71. The first buffer 65 receives stress from the housing 5 at the outer region relative to the first screw 71 (i.e., fixing portion).

The second buffer 66 of the present embodiment includes a first portion 103 which is bent from the midway of the sixth surface 56 of the HDD 41 toward the fifth wall 35 of the HDD accommodation portion 24, and a second portion 104 which extends from the end portion of the first portion 103 substantially in parallel to the fifth wall 35 of the HDD 41. The first portion 103 protrudes further outward than the second screw 72 in the protruding direction of the second screw 72. The second portion 104 is configured to come into contact with at least one of the housing 5 and the HDD cover 37 earlier than the second screw 72. The second buffer 66 receives stress from at least one of the housing 5 and the HDD cover 37 on the outer side than the second screw 72 (i.e., fixing portion).

According to such a configuration, it is possible to improve the impact resistance of the electronic apparatus 1 similarly to the second embodiment.

Fifth Embodiment

FIG. 14 illustrates the electronic apparatus 1 according to the fifth embodiment. In the present embodiment, the first and second buffers 65 and 66 do not include the second portions 92 and 94, respectively. The fourth wall 34 of the HDD accommodation portion 24 includes a projection 111 which protrudes toward the first portion 91 of the first buffer 65. Thus, the first portion 91 of the first buffer 65 can come into contact with the projection 111 of the fourth wall 34 earlier than the first screw 71 coming into contact with the fourth wall 34 of the HDD accommodation portion 24. In this way, the first buffer 65 can absorb a part of impact before the first screw 71 comes into contact with the housing 5, and the impact is transmitted from the first screw 71 to the HDD 41. Accordingly, it is possible to alleviate the impact applied to the HDD 41 and to improve the impact resistance of the electronic apparatus 1.

Similarly, the rib 96 of the HDD cover 37 protrudes toward the first portion 93 of the second buffer 66 further than the fifth wall 35 of the HDD accommodation portion 24. Thus, the first portion 93 of the second buffer 66 can come into contact with the rib 96 of the HDD cover 37 earlier than the second screw 72 coming into contact with the fifth wall 35 of the HDD accommodation portion 24. In this way, the second buffer 66 can absorb a part of impact before the second screw 72 comes into contact with the housing 5, and the impact is transmitted from the second screw 72 to the HDD 41. Accordingly, it is possible to alleviate the impact applied to the HDD 41 and to improve the impact resistance of the electronic apparatus 1.

Sixth Embodiment

Figure 15:
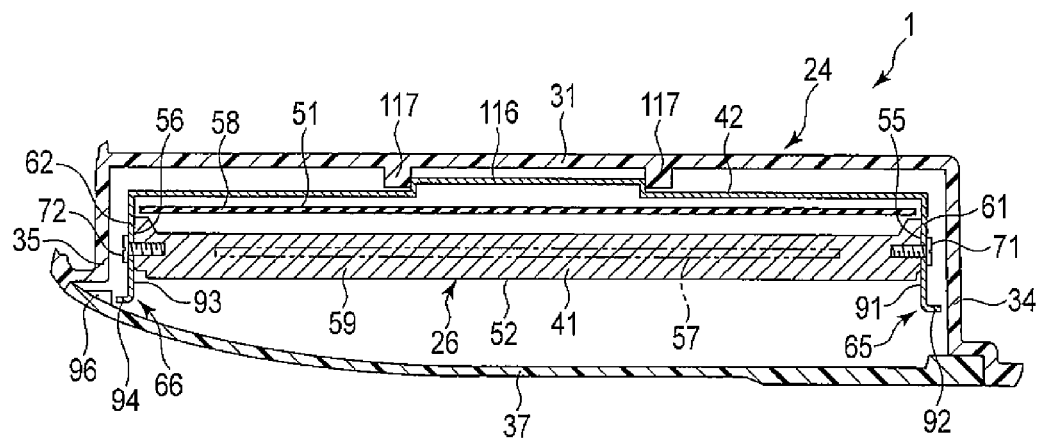
FIG. 15 is an exemplary cross-sectional view of an HDD accommodation portion according to a sixth embodiment.

FIG. 15 illustrates the electronic apparatus 1 according to the sixth embodiment. In the present embodiment, the holder 42 includes a protruding portion 116 which protrudes further outward than the HDD 41 in the thickness direction of the HDD 41. The protruding portion 116 is an example of a portion that comes into contact with a part of the housing 5 (for example, the HDD accommodation portion 24) and receives pressing force applied in a direction crossing the thickness direction of the HDD 41, and is a so-called receiver (i.e., engagement portion). As shown in FIG. 15, the protruding portion 116 is located at a position away from the side surface (i.e., the fifth and sixth surfaces 55 and 56) of the HDD 41.

On the other hand, the housing 5 (for example, the HDD accommodation portion 24) includes a protruding portion 117 (i.e., contact portion) which faces the protruding portion 116 of the holder 42 in a direction (for example, a substantially perpendicular direction) crossing the thickness direction of the HDD 41. The protruding portion 117 is configured to come into contact with the protruding portion 116 of the holder 42 in the direction (for example, a substantially perpendicular direction) crossing the thickness direction of the HDD 41 and apply the pressing force applied in the direction (for example, a substantially perpendicular direction) crossing the thickness direction of the HDD 41 to the holder 42.

The protruding portion 117 of the housing 5 and the protruding portion 116 of the holder 42 may be in contact with each other in a normal state, and may be separated from each other in the normal state and apply the pressing force by coming into contact with each other when impact is applied so that the HDD unit 26 is displaced laterally.

According to such a configuration, it is possible to suppress displacement (for example, lateral displacement) of the HDD unit 26 and to alleviate a load applied to the first and second connectors 28 and 43. Moreover, according to the above configuration, similarly to the second embodiment, it is possible to improve the impact resistance of the electronic apparatus 1. In addition, the protruding portion 117 may be formed on the HDD cover 37.

Seventh Embodiment

Figure 16:
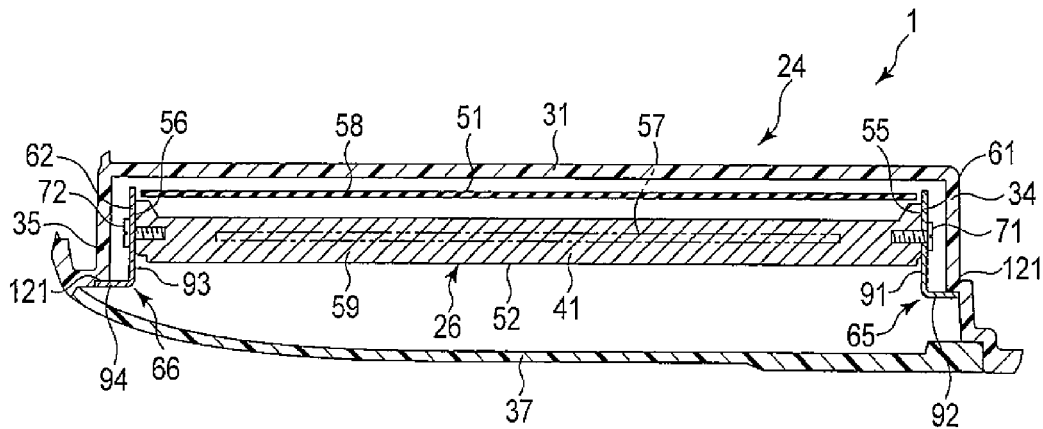
FIG. 16 is an exemplary cross-sectional view of an HDD accommodation portion according to a seventh embodiment.

FIG. 16 illustrates the electronic apparatus 1 according to the seventh embodiment. In the present embodiment, the housing 5 (for example, the HDD accommodation portion 24) includes receivers 121 (i.e., mounting portions) that receive the second portions 92 and 94 of the first and second buffers 65 and 66. The receivers 121 face the first and second buffers 65 and 66 in the thickness direction of the HDD 41. Moreover, the receivers 121 are examples of a portion that receives pressing force applied in a direction (for example, a substantially perpendicular direction) crossing the thickness direction of the HDD 41.

According to such a configuration, since the first and second buffers 65 and 66 are mounted on the receivers 121, it is possible to suppress displacement (for example, lateral displacement) of the HDD unit 26 and to alleviate a load applied to the first and second connectors 28 and 43. Moreover, according to the above configuration, similarly to the second embodiment, it is possible to improve the impact resistance of the electronic apparatus 1.

Eighth Embodiment

Figure 17:
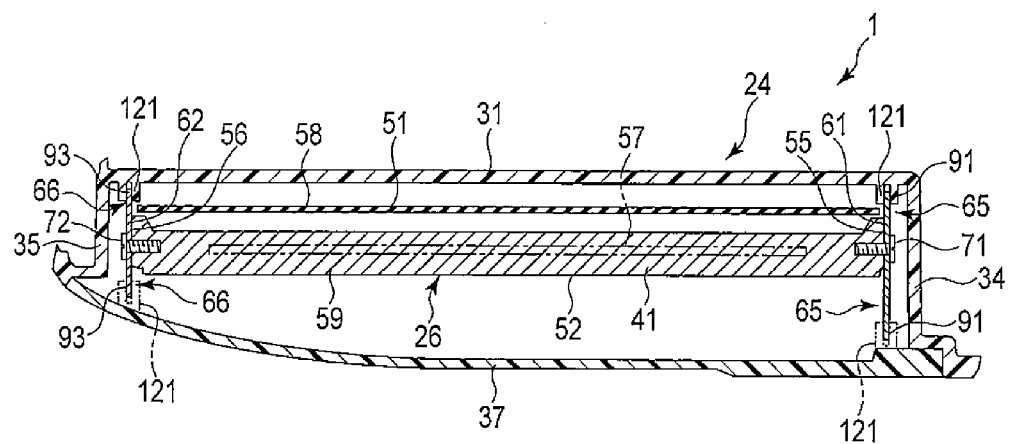
FIG. 17 is an exemplary cross-sectional view of an HDD accommodation portion according to a eighth embodiment.

FIG. 17 illustrates the electronic apparatus 1 according to the eighth embodiment. In the present embodiment, the housing 5 (for example, the HDD accommodation portion 24) includes receivers 125 that support the holder 42. The receivers 125 are ribs which interpose a portion (for example, the first or second buffers 65 or 66) of the holder 42 protruding further outward than the HDD 41 in the thickness direction of the HDD 41, for example. The portion (for example, the first or second buffer 65 or 66) of the holder 42 coming into contact with the receivers 125 is an example of a portion that receives pressing force applied in a direction (for example, a substantially perpendicular direction) crossing the thickness direction of the HDD 41.

According to such a configuration, it is possible to suppress displacement (for example, lateral displacement) of the HDD unit 26 and to alleviate a load applied to the first and second connectors 28 and 43. Moreover, according to the above configuration, similarly to the second embodiment, it is possible to improve the impact resistance of the electronic apparatus 1. In addition, the receivers 125 may be provided on the HDD cover 37 instead of the housing 5, or in addition to the housing 5.

The portion of the holder receiving the pressing force from the receivers 125 is not limited to a portion which is bent (which has a damper function) when pressing force is applied thereto like the first and second buffers 65 and 66, but may be a portion which is not bent. Moreover, this portion of the holder may be in contact with the receivers 125 in a normal state, and may be separated from the receivers 125 in the normal state and receive the pressing force by coming into contact with the receivers 125 when impact is applied so that the HDD unit 26 is displaced laterally. The above statements are equally applied to the ninth embodiment below.

Ninth Embodiment

Figure 18:
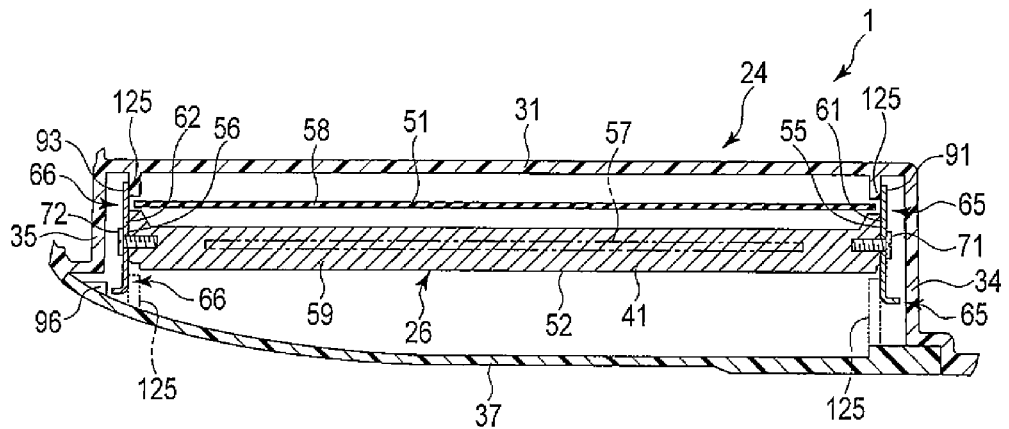
FIG. 18 is an exemplary cross-sectional view of an HDD accommodation portion according to a ninth embodiment.

FIG. 18 illustrates the electronic apparatus 1 according to the ninth embodiment. In the present embodiment, the housing 5 (for example, the HDD accommodation portion 24) includes receivers 125 that support the holder 42. The receivers 125 are ribs which come into contact with a portion (for example, the first or second buffers 65 or 66) of the holder 42 protruding further outward than the HDD 41 in the thickness direction of the HDD 41, for example in the direction (for example, a substantially perpendicular direction) crossing the thickness direction of the HDD 41. The portion (for example, the first or second buffer 65 or 66) of the holder 42 coming into contact with the receivers 125 is an example of a portion that receives pressing force applied in a direction (for example, a substantially perpendicular direction) crossing the thickness direction of the HDD 41.

According to such a configuration, it is possible to suppress displacement (for example, lateral displacement) of the HDD unit 26 and to alleviate a load applied to the first and second connectors 28 and 43. Moreover, according to the above configuration, similarly to the second embodiment, it is possible to improve the impact resistance of the electronic apparatus 1. In addition, the receivers 125 may be provided on the HDD cover 37 instead of the housing 5, or in addition to the housing 5.

The present embodiments are not limited to the embodiments described above, and may be realized by modifying constituent elements in the implementing step within a range without departing from the spirit of the invention. Moreover, various embodiments can be made by appropriately combining a plurality of constituent elements disclosed in the embodiments described above. For example, some constituent elements may be omitted from all constituent elements disclosed in the embodiments. Furthermore, constituent elements in different embodiments may be combined appropriately.

For example, the shapes and materials of the first and second buffers 65 and 66, the protruding portions 116 and 117, the receivers 121 and 125, and the like are not limited to the above examples. It is not always necessary to form both the first and second buffers 65 and 66, and any one of them may be provided. That is, the holder 42 may include only a portion which receives the stress (i.e., pressing force) from the HDD cover 37 but not receives the stress (i.e., pressing force) from the housing 5. An example of the electronic apparatus 1 may be an electronic apparatus which includes a housing including a cover, a module, a fixing portion provided in the module, and a supporting portion configured to support the module and comprising a portion configured to receive stress from the cover at an outer region relative to (i.e., at an outside of) the fixing portion.

In the above description, although some constituent elements are denoted by the ordinal numbers like "first," "second," and the like in the order of description for the sake of convenience, they may be appropriately denoted by different ordinal numbers.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
a housing;
a module comprising a side surface;
a holder comprising a plate portion along the side surface and configured to hold the module;
a first screw configured to attach the holder to the module, the first screw protruding from the module in a direction crossing a thickness direction of the module; and
a first buffer on the holder, the first buffer comprising a first portion which is a plate portion extending from the plate portion of the holder in the thickness direction of the module to protrude outside the module, and a second portion which is an end portion of the first portion in the thickness direction of the module, the end portion being bent to protrude outwardly beyond the first screw, in a direction of protrusion of the first screw, the second portion configured to contact the housing before the first screw at a position not overlapping the side surface of the module,
wherein:
the housing comprises an accommodation portion configured to accommodate the module, the accommodation portion comprising a cover configured to cover the accommodation portion and further comprising a wall opposite the cover, and
the first buffer is bendable in a direction opposite to the direction of protrusion of the first screw to be in a space between the module and the wall opposite the cover, or in a space between the cover and the module, when the first buffer contacts the housing.

2. The electronic apparatus of claim 1, wherein the first portion has a surface facing in the direction of protrusion of the first screw.

3. The electronic apparatus of claim 1, further comprising a metallic member comprising the holder and the first buffer.

4. The electronic apparatus of claim 1, wherein:
the module comprises a board portion and a disk portion that overlaps the board portion in the thickness direction of the module, the disk portion being mechanically weaker than the board portion, and the first portion is configured to protrude from the disk portion.

5. The electronic apparatus of claim 1, the accommodation portion comprising a wall facing the second portion of the first buffer.

6. The electronic apparatus of claim 5, wherein:
the accommodation portion comprises an opening that exposes the module, and the first portion protrudes toward the opening from an inside of the accommodation portion.

7. The electronic apparatus of claim 6, further comprising:
a second screw configured to attach the holder to the module, the second screw protruding in a direction opposite to the first screw; and
a second buffer on the holder, the second buffer comprising a first portion which protrudes outside the module in the thickness direction of the module, and a second portion which is an end portion of the first portion of the second buffer in the thickness direction of the module, the end portion being bent to protrude outwardly beyond the second screw in the direction of protrusion of the second screw.

8. The electronic apparatus of claim 7, further comprising a cover configured to cover the accommodation portion,
wherein the second portion of the second buffer is configured to contact the cover before the second screw contacts the housing.

9. An electronic apparatus comprising:
a housing;
a module comprising a side surface;
a holder comprising a plate portion along the side surface and configured to hold the module;
a first screw configured to attach the holder to the module, the first screw protruding from the module in a direction crossing a thickness direction of the module; and
a first buffer on the holder, the first buffer comprising a first portion which is a plate portion extending from the plate portion of the holder in the thickness direction of the module to protrude outside the module, and a second portion which is an end portion of the first portion in the thickness direction of the module, the end portion being bent to protrude outwardly beyond the first screw, in a direction of protrusion of the first screw, the second portion configured to contact the housing before the first screw at a position not overlapping the side surface of the module,
wherein:
the housing comprises an accommodation portion configured to accommodate the module, the accommodation portion comprising a wall facing the side surface of the module, and
the first buffer is separated from the wall of the accommodation portion when no external force is applied and is configured to come into contact with the wall of the accommodation portion when an external force is applied to move the module toward the wall of the accommodation portion.

10. The electronic apparatus of claim 1, wherein:
the module has a rectangular shape, and
the first buffer is provided along a longitudinal side of the module.

11. An electronic apparatus comprising:
a housing;
a module comprising a side surface;
a holder comprising a plate portion along the side surface and configured to hold the module;
a first screw configured to attach the holder to the module, the first screw protruding from the module in a direction crossing a thickness direction of the module; and
a first buffer on the holder, the first buffer comprising a first portion which is a plate portion extending from the plate portion of the holder in the thickness direction of the module to protrude outside the module, and a second portion which is an end portion of the first portion in the thickness direction of the module, the end portion being bent to protrude outwardly beyond the first screw, in a direction of protrusion of the first screw, the second portion configured to contact the housing before the first screw at a position not overlapping the side surface of the module,
wherein:
the housing comprises an accommodation portion configured to accommodate the module, the accommodation portion comprising a first connector,
the module comprises a second connector and is slidable toward the first connector in the accommodation portion to engage the first connector with the second connector, and
the first buffer is provided along the side of the module in a direction of slide and the second portion protrudes beyond the first screw in a direction crossing the direction of slide.

12. The electronic apparatus of claim 1, wherein the first buffer overlaps with the first screw in the thickness direction of the module.

13. The electronic apparatus of claim 1, wherein the electronic apparatus is a television.

* * * * *